United States Patent

Dahlberg

[11] Patent Number: 5,485,817
[45] Date of Patent: Jan. 23, 1996

[54] ARRANGEMENT IN AN INTERNAL COMBUSTION ENGINE

[75] Inventor: Sven G. B. Dahlberg, Gränna, Sweden

[73] Assignee: Aktiebolaget Electrolux, Stockholm, Sweden

[21] Appl. No.: 391,549

[22] Filed: Feb. 21, 1995

[30] Foreign Application Priority Data

Mar. 9, 1994 [SE] Sweden .................................. 9400795

[51] Int. Cl.$^6$ .................................................. F02B 77/00
[52] U.S. Cl. ....................... 123/198 E; 123/41.7; 55/437; 55/DIG. 28
[58] Field of Search .............................. 123/41.56, 41.65, 123/41.7, 198 E; 55/337, 357, 392, 437, 473, DIG. 14, DIG. 28

[56] References Cited

FOREIGN PATENT DOCUMENTS 244113   9/1989   Japan .................................. 123/41.65

*Primary Examiner*—Noah P. Kamen
*Attorney, Agent, or Firm*—Pearne, Gordon, McCoy & Granger

[57] ABSTRACT

A two-stroke internal combustion engine for a motor saw includes a crankcase (12), a fan housing (19) having an impeller (20), and a carburetor chamber (17) having a carburetor (16). An intake passage (15) connects the carburetor to the crankcase and the carburetor chamber is connected via an inlet passage (21) to the fan housing at the outlet side of the impeller for centrifugal purification of combustion air. The carburetor chamber (17) has an opening (22) connected to atmosphere or to a lowpressure zone of the fan housing (19).

6 Claims, 4 Drawing Sheets

ARRANGEMENT IN AN INTERNAL COMBUSTION ENGINE

BACKGROUND OF THE INVENTION

The present invention relates to an arrangement in a two-stroke internal combustion engine, especially for a motor saw, the engine having a crankcase, a fan housing including an impeller, and a carburetor provided in a carburetor chamber. The carburetor is connected to the crankcase via an intake passage, and the carburetor chamber is connected via an inlet passage to the fan housing on the outlet side of the impeller.

In two-stroke engines of the aforementioned type, the intake tube from the carburetor is normally connected to the crankcase of the engine via a suitable non-return valve, or via a piston controlled intake port in the cylinder wall. The crankcase and the intake tube define spaces which, from the point of view of aerodynamics, can be referred to as a Helmholz resonator, the resonance frequency of which is related to the geometry of the spaces. Furthermore, some types of motor saws are provided with an arrangement for centrifugal purification of combustion air, wherein the air is conducted via a passage from a zone adjacent to the periphery of the impeller to the carburetor chamber. It is a prerequisite for this arrangement that the carburetor chamber be fairly airtight. The carburetor chamber and the passage define a second Helmholz resonator which is thus connected in series with the first-mentioned Helmholz resonator.

It has appeared that two such oscillating systems connected in series have a negative effect on the filling ratio of the engine at certain speed ranges, resulting in a reduction of the performance of the engine. The factors affected are primarily power and torque, but also the contents of CO of the exhaust gases.

SUMMARY OF THE INVENTION

An object of the present invention is to provide an arrangement in an internal combustion engine by which the above-mentioned disadvantage has been eliminated or at least essentially reduced. This has been achieved by an arrangement wherein the carburetor chamber has an opening connected to atmosphere or to a low pressure zone of the fan housing.

BRIEF DESCRIPTION OF THE DRAWINGS

The invention will be hereafter described in more detail with reference to the accompanying drawings, wherein.

DETAILED DESCRIPTION OF THE PREFERRED EMBODIMENTS

Figure 2:
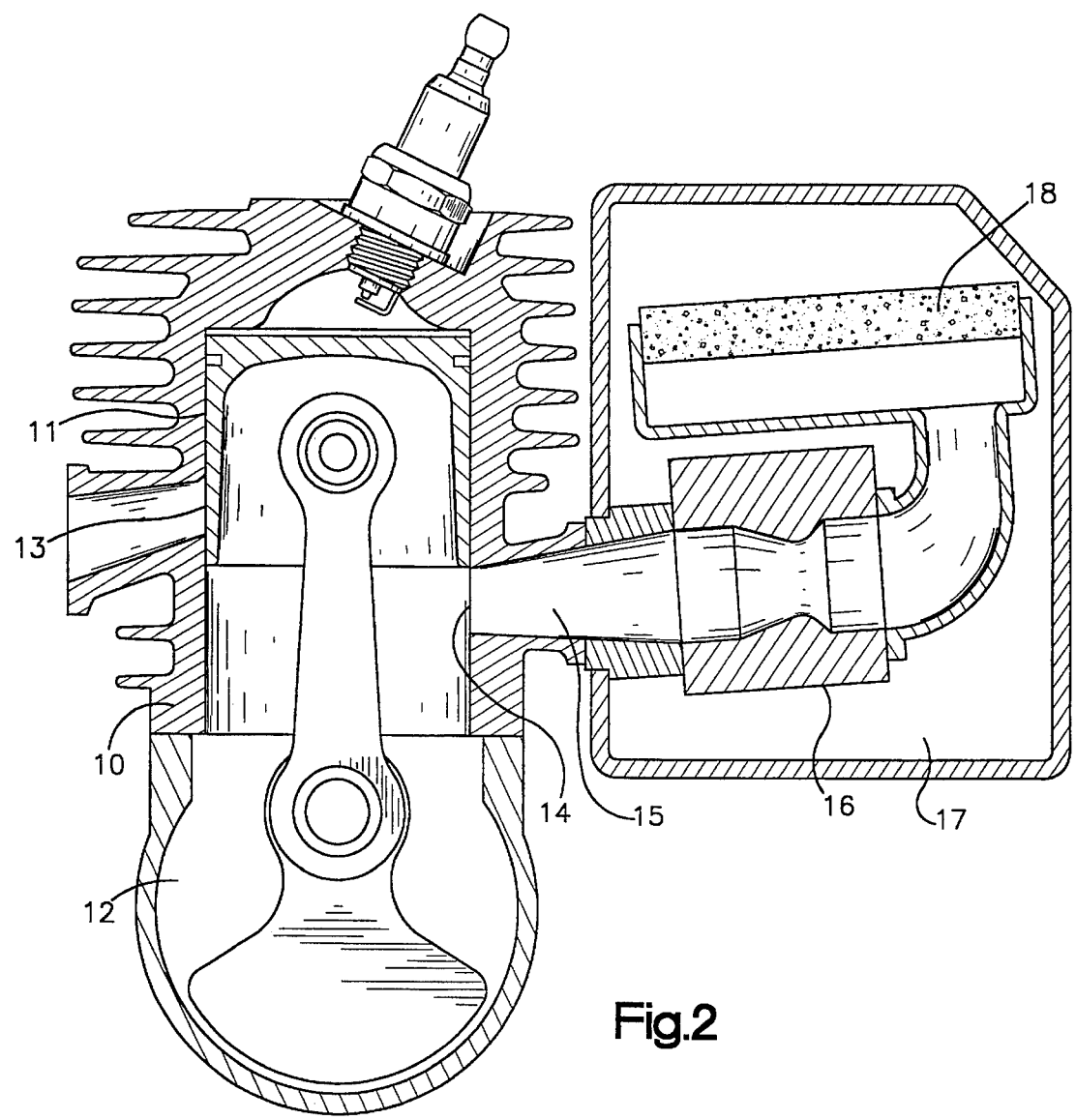
FIG. 2 is a vertical section as viewed along line II—II of FIG. 1.

The two-stroke engine shown in the drawings comprises a cylinder 10 having a piston 11 movable therein, and a crankcase 12. The cylinder has an exhaust port 13 and an intake port 14, each of the ports being controlled by the piston 11. The intake port 14 is connected via an intake passage 15 to a carburetor 16 provided in a carburetor chamber 17. The carburetor 16, which is shown diagrammatically in FIG. 2, is provided with an air filter 18 on the inlet side thereof.

Figure 3:
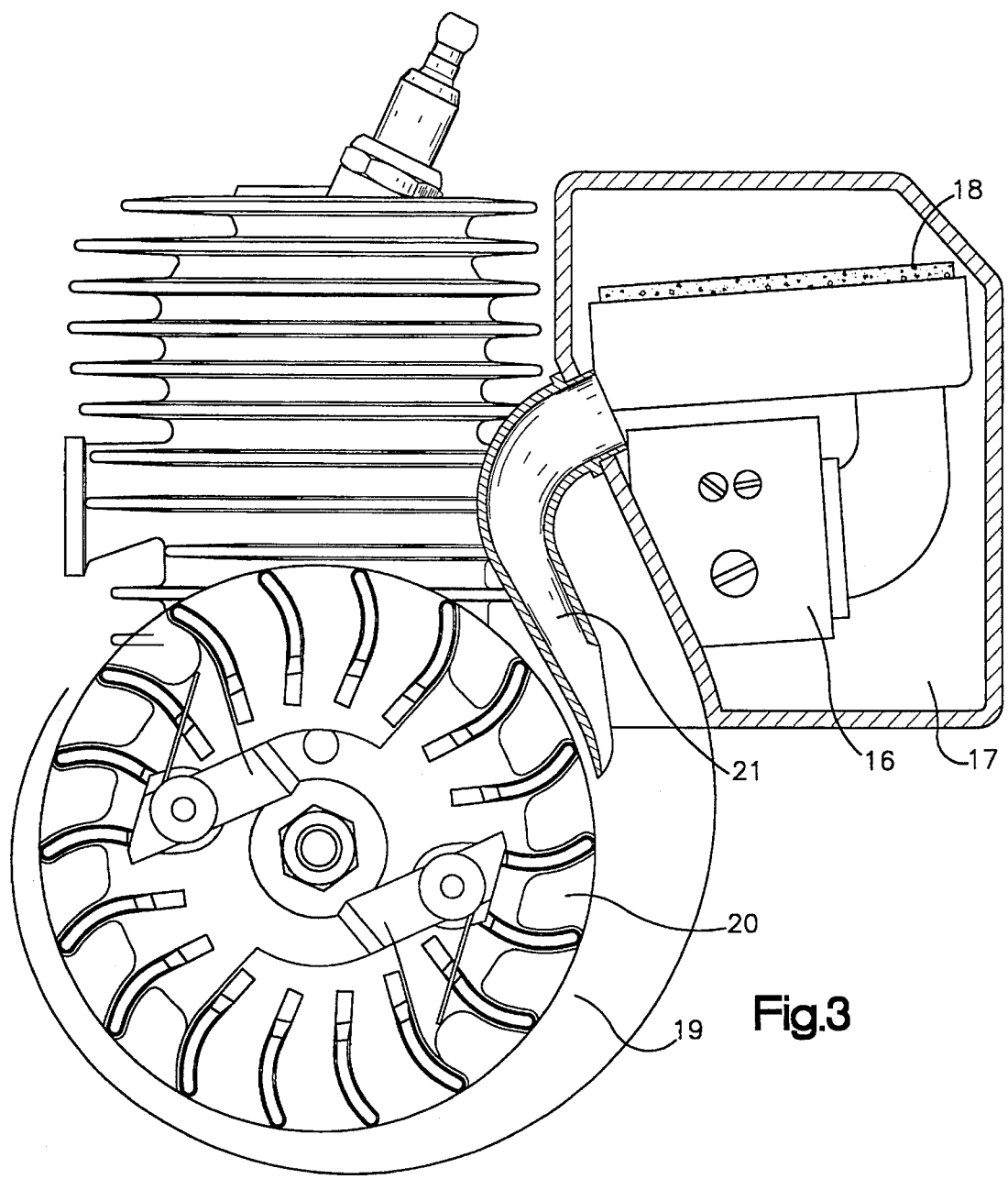
FIG. 3 is a side elevation in which a portion of the engine is shown in section along line III—III of FIG. 1.

As is best seen in FIG. 3, the engine has a fan housing 19 with an impeller 20 provided therein, the impeller producing an air current for cooling the cylinder 10. The shown engine has an arrangement for centrifugal purification of combustion air, comprising an air passage 21 conducting air from a point adjacent the periphery of the impeller to the carburetor chamber 17. By adapting the dimensions of the air passage 21 in relation to the amount of air consumed by the engine, it is possible to control the pressure in the carburetor chamber in order to provide either an over-pressure or an under-pressure.

The crankcase 12 and the intake passage 15 define a first Helmholz resonator, and the air passage 21 together with the carburetor chamber 17 define a second such resonator connected in series with the first mentioned one. As has been mentioned above, two such oscillating systems connected in series normally result in reduced performance of the engine at certain speed ranges, due to an impaired filling ratio of the engine.

Figure 1:
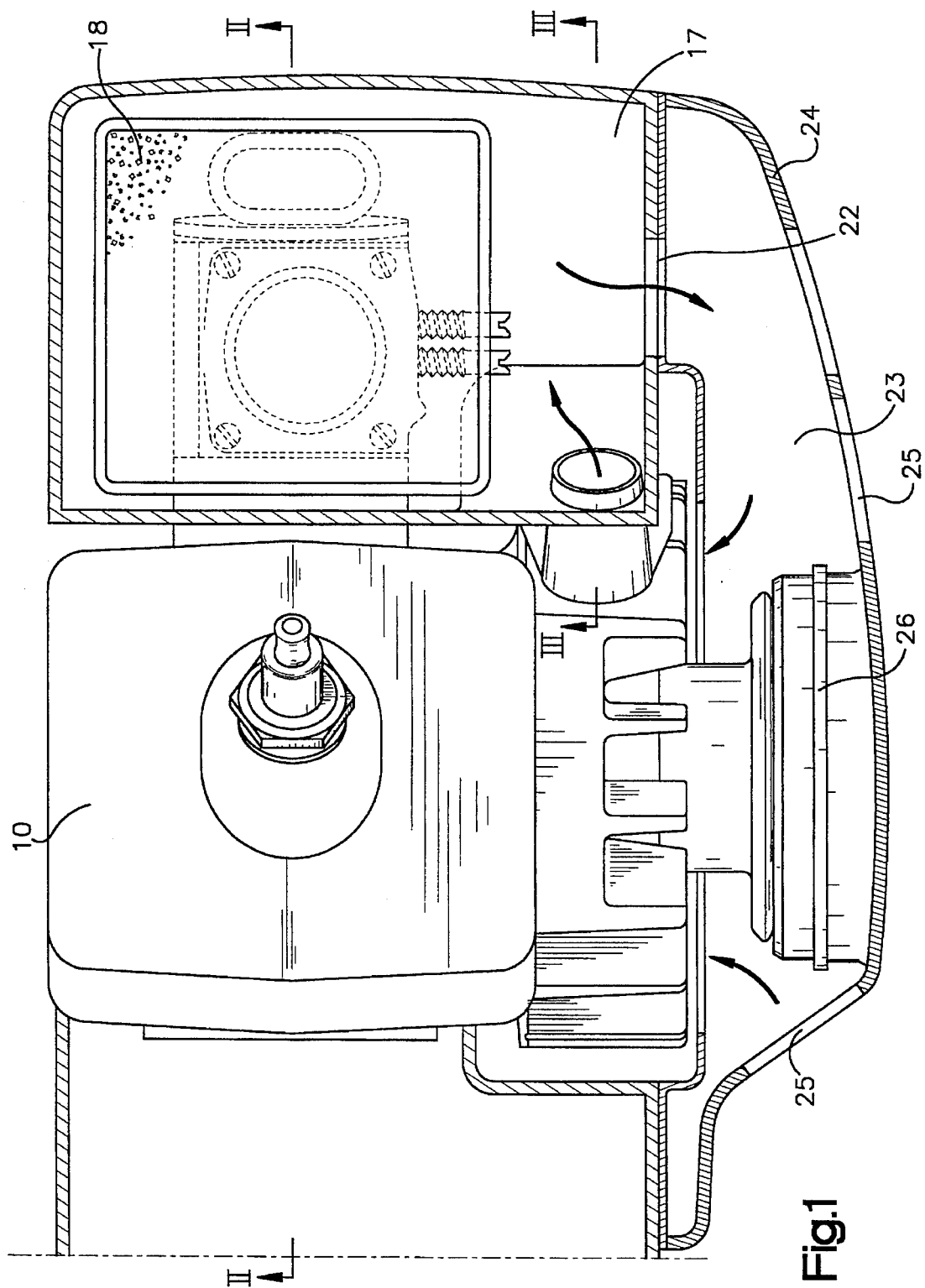
FIG. 1 is a top plan view, partly in section, of an internal combustion engine provided with a first embodiment of the arrangement according to the invention.

In the embodiment shown in FIG. 1, the carburetor chamber has an opening 22 which is connected via a passage 23 to the fan housing 19 on the intake side of the impeller 20. In this case, the air passage 21 is assumed to be dimensioned so as to provide an under-atmospheric pressure in the carburetor chamber. Due to the fact that the impeller 20 creates an under-pressure on the intake side thereof, an air flow from the carburetor chamber through the opening 22 is ensured, as shown by the arrow in FIG. 1, whereby unclean air and debris are prevented from entering the carburetor chamber through said opening. The passage 23 is formed by a fan cover 24 provided with inlet openings 25. A starter 26 is provided inside the fan cover 24.

Figure 4:
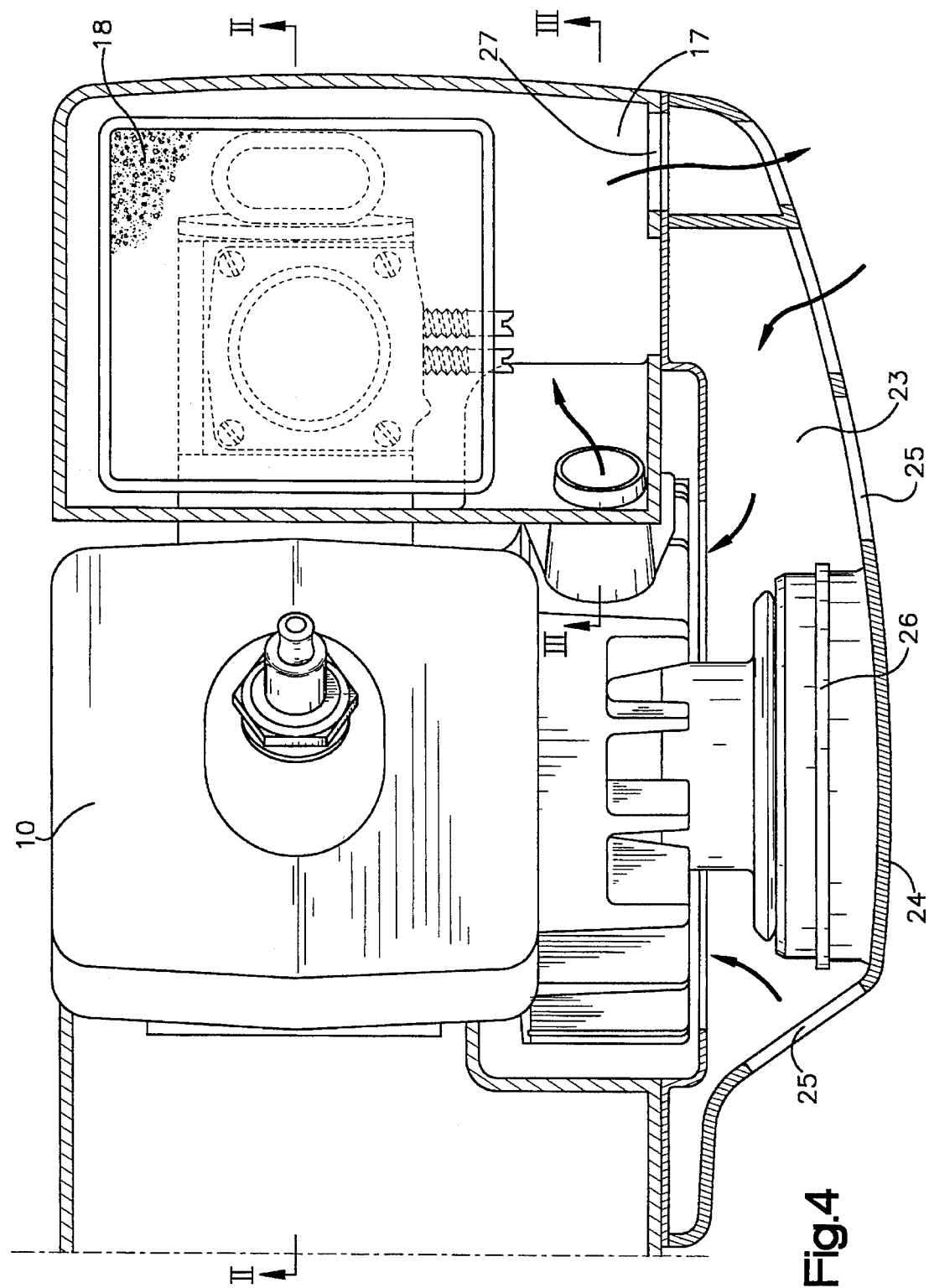
FIG. 4 is a view corresponding to FIG. 1 of a second embodiment of the invention.

In the embodiment shown in FIG. 4, the air passage is assumed to be dimensioned so as to provide an over-pressure in the carburetor chamber. The surplus air is evacuated via opening 27 to the atmosphere, as is shown by the arrow in FIG. 4. Even in this case, the discharged air current prevents unclean air and impurities from entering the carburetor chamber via opening 22.

In order to provide an efficient reduction of disturbing oscillations, the opening 22 should have an area sufficiently large in relation to the volume of the carburetor chamber. It can be mentioned as an example that an area of at least about 1.5 $cm^2$ has appeared to be appropriate for the size of engines commonly used in motor saws.

Although the preferred embodiments of this invention have been shown and described, it should be understood that various modifications and rearrangements of the parts may be resorted to without departing from the scope of the invention as defined by the claims appended hereto.

I claim:

1. Arrangement in a two-stroke internal combustion engine, said engine comprising a crankcase (12), a fan housing (19) having an impeller (20), and a carburetor chamber (17) having a carburetor (16), said carburetor being connected to said crankcase via an intake passage (15) and said carburetor chamber being connected via an inlet passage (21) to said fan housing on an outlet side of said impeller, wherein the carburetor chamber (17) has an opening (22) connected to a low pressure zone of the housing (19).

2. Arrangement according to claim 1, wherein the opening (22) is connected via a passage (23) to the fan housing (19) on the inlet side of the impeller (20).

3. Arrangement according to one of claims 1 or 2, wherein the opening (22) has an area of at least about 1.5 cm$^2$.

4. Arrangement in a two-stroke internal combustion engine, said engine comprising a crankcase, a fan housing having an impeller, and a carburetor chamber having a carburetor, said carburetor being connected to said crankcase via an intake passage and said carburetor chamber being connected via an inlet passage to said fan housing on an outlet side of said impeller, wherein the carburetor chamber has an opening connected to atmosphere.

5. Arrangement according to claim 4, wherein the carburetor chamber (17) is exposed to an overpressure by combustion air supplied via the inlet passage (21) and that the opening (22) is connected to the atmosphere.

6. Arrangement according to one of claims 4 or 5, wherein the opening (22) has an area of at least about 1.5 cm$^2$.

* * * * *